Sept. 9, 1941. J. P. BURKE 2,255,101
CAGE NUT
Filed Sept. 25, 1939

INVENTOR.
James P. Burke
BY
ATTORNEY.

Patented Sept. 9, 1941

2,255,101

UNITED STATES PATENT OFFICE 2,255,101

CAGE NUT

James P. Burke, Knoxville, Tenn., assignor to F. L. McLaughlin, Detroit, Mich.

Application September 25, 1939, Serial No. 296,363

3 Claims. (Cl. 85—32)

This invention relates to nuts and has for its primary objects to provide a nut having a sheet metal cage with clinching means for retaining the nut on a structural element and an improved method of manufacturing the cage.

An important object is to provide a sheet metal cage for a nut which is so constructed that it may be formed from a square blank with no waste material and, more particularly, from a blank of smaller size than is ordinarily used for a nut of given size. According to this object, a strip of sheet metal is severed to form square blanks, the square blanks are centrally pierced to provide an opening through which a screw or bolt may extend and also to provide upstanding prongs which are adapted to be inserted through an aperture in a supporting member and clinched over to retain the cage on the supporting member. In this respect economy is achieved because the metal removed to form the necessary opening for the screw or bolt is utilized to form the clinching prongs. The corners, instead of the sides of the square blank, are bent to form the cage or nut receiving portion, and to retain the nut in the cage the tips of the upwardly bent corner portions are bent over the outside surface of the nut.

Another object is to teach alternative formations of the clinching prongs. In one form the clinching prongs are arranged to fit a square opening and are so arranged that the sides of the nut will reside parallel to the opening after the cage is clinched therein. In another case the prongs are so arranged that the sides of the nut are parallel to diagonals of the square opening in which the cage is clinched, a construction which results in greater strength as will hereinafter appear. In still another case the prongs are arranged to fit a D-shaped opening.

Other objects and advantages will become more fully apparent as reference is had to the accompanying drawing wherein my invention is illustrated, and in which.

More particularly, 1 designates a nut of the conventional type, of square form as viewed in plan, and having an internally screwthreaded bore 2 extending therethrough. The nut is disposed within a cage 3, formed of sheet metal, and having upstanding prongs 4 adapted to be inserted through an aperture in a supporting member, such as the one indicated at 5 by broken lines, and thereafter clinched over as indicated at 4' to retain the cage and nut on the member 5. Generally speaking, cage nuts such as broadly defined above are in common use, and the invention here concerned constitutes an improvement thereon.

Figure 1:
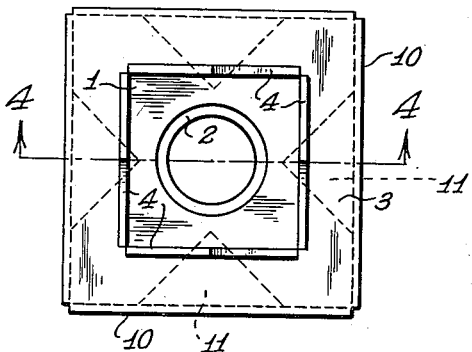
Fig. 1 is a top plan view of the nut.
Figure 2:
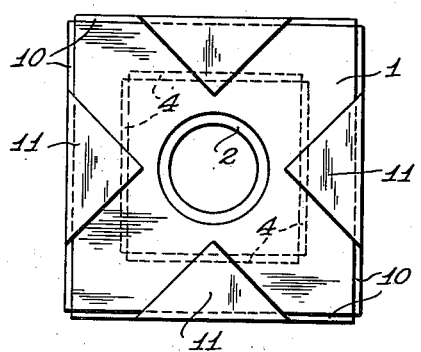
Fig. 2 is a bottom plan.
Figure 3:
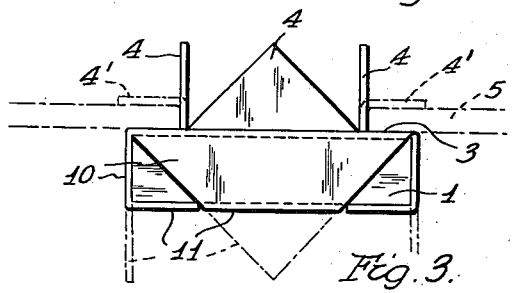
Fig. 3 is a side elevation.
Figure 4:
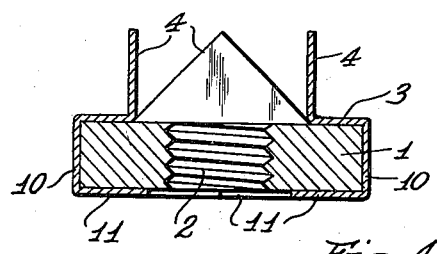
Fig. 4 is a section taken on the line 4—4 of Fig. 1.
Figure 6:
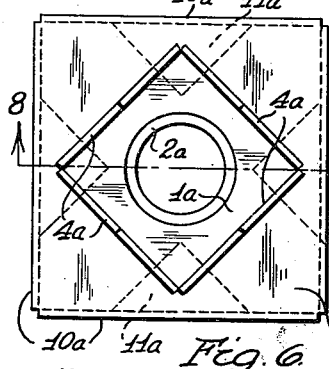
Fig. 6 is a top plan of a nut, illustrating a modified arrangement of the clinching means.
Figure 7:
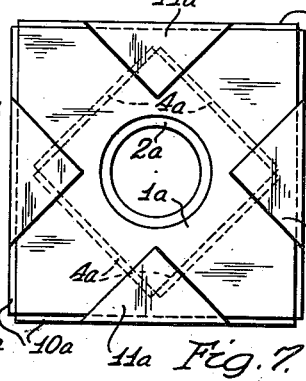
Fig. 7 is a bottom plan of the modified nut.
Figure 8:
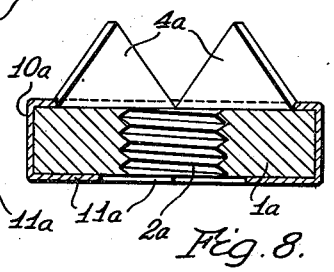
Fig. 8 is a section taken on the line 8—8 of Fig. 6.
Figure 5:
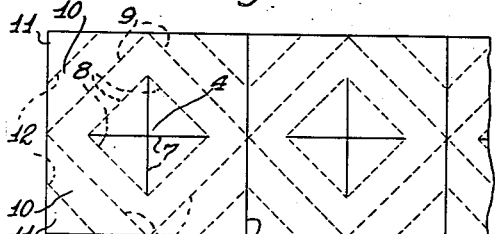
Fig. 5 is a plan of the sheet metal blank from which the cage is formed.
Figure 9:
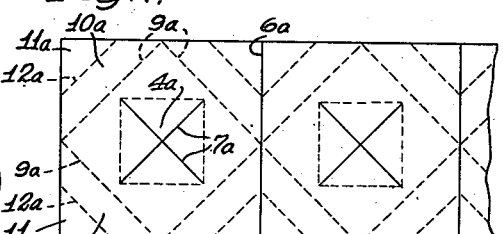
Fig. 9 is a plan of the blank from which the modified nut is formed.

The blank shown in Fig. 5 comprises a strip of sheet metal, having parallel side edges, which is severed along lines 6 extending perpendicular to the side edges to form the blank into squares. The squares are severed along crossed lines 7, which cross in the exact center of the squares, which are parallel to respective sides of the square, and which terminate in spaced relation to the sides of the square that they are nearest. The square blank is then bent along lines 8, which comprise straight lines connecting the terminals of the slits 7, to form the clinching prongs 4. Each square blank is also bent along four lines 9, which extend perpendicularly to respective diagonals of the blank and define the bottom side edges of the nut. The corners 10, disposed outwardly of the bend lines 9, are to be bent up and over the side edges of the nut as a cage for the reception of the nut 1.

Although the several operations are above described as separate steps it will be understood, of course, that they may all be performed simultaneously by one operation of a punch press, or in any other sequence that might be found more convenient in view of the type of machinery employed.

Two methods of clinching the corner tips 11 are contemplated. In one case the nut 1 is inserted in the cage, the corner tips clinched, and, after assembly into unitary form, the cage and nut are subsequently clinched onto the supporting member 5 as above described. The other method consists in placing the prongs 4 of the cage 3 in the aperture in the supporting member 5, thereafter placing the nut 1 in the cage, and finally clinching the prongs 4 and the corner tips 11 simultaneously.

The cage construction shown in Figs. 6 to 9 is substantially the same as that shown and described above and the same description may be applied thereto by referring to corresponding numerals having the letter "a" added thereto. For example, the part 1 of Figs. 1 to 5 corresponds with 1a of Figs. 6 to 9, 2 corresponds to 2a, and so on.

The form shown in Figs. 6 to 9 differs from the first described form in the formation of the prong forming slits 7a. As may be seen in Fig. 9 the lines 7a are disposed diagonally of the blank, with the result that the prongs 4a are shifted through 90° as compared with the first described form. By diagonally arranging the slits 7a they terminate a greater distance from the nearest edge of the square blank than they do when arranged as shown in the first described form.

Figure 10:
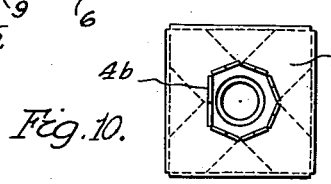
Fig. 10 is a plan illustrating clinching prongs arranged to fit a D-shaped aperture.

The clinching prongs 4 and 4a are both arranged to fit a square aperture and although this is desirable it is not essential. As illustrated in Fig. 10, the cage 3b, formed in a manner similar to the cages 3 and 3a, has the prongs 4b arranged to fit a D-shaped aperture.

Although specific embodiments of the invention have been illustrated and described, it will be understood that various changes may be made in the details of construction without departing from the spirit of the invention, and such changes are contemplated.

What is claimed is:

1. A nut cage comprising a square sheet metal blank having a central portion struck therefrom and forming an opening and a multiplicity of clinching prongs in normal relation to the main portion of the blank, the corner portions of said blank extending outwardly with respect to the main portion of the blank in a direction opposite to the prongs and along lines arranged in substantially square relation and substantially normal to respective diagonals of the blank, said lines being so disposed with respect to the center of the blank that each corner of the square formed thereby resides at the mid-point in the length of a side wall of said blank.

2. A nut cage comprising a square sheet metal blank having its corner portions bent in the form of triangles disposed in an upstanding position and forming a square whose sides cross diagonals of the blank at 90°, the central portion of the blank being struck therefrom in a direction opposite to the corners and forming a central opening and a multiplicity of clinching prongs.

3. A nut cage adapted to be bent about a square nut, said cage comprising a square sheet metal blank, said blank having four bend lines arranged in the form of a square approximately corresponding to the size of the nut to be received, each of said bend lines being bisected by a diagonal of the blank and being so spaced from the center of the blank that two bend lines meet at the mid point in the length of each side edge of the blank, the triangular corner portions disposed outwardly of said bend lines being adapted to be bent perpendicularly to the main portion of the blank to define the bottom and side edges of the nut to be received, said corner portions each having an additional bend line extending parallel to respective first named bend lines along which the corner portions are adapted to be bent to place the tips of the corner portions in overlying relation with a nut received in the cage.

JAMES P. BURKE.